US008471845B1

(12) United States Patent
Stich

(10) Patent No.: US 8,471,845 B1
(45) Date of Patent: Jun. 25, 2013

(54) SYSTEM AND METHOD FOR CONSTRUCTING A BOUNDING VOLUME HIERARCHICAL STRUCTURE

(75) Inventor: Martin Stich, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 832 days.

(21) Appl. No.: 12/533,922

(22) Filed: Jul. 31, 2009

(51) Int. Cl.
*G06T 15/00* (2011.01)
(52) U.S. Cl.
USPC .......................................... 345/419; 345/426
(58) Field of Classification Search
None
See application file for complete search history.

(56) References Cited

U.S. PATENT DOCUMENTS

2009/0167763 A1* 7/2009 Waechter et al. ............. 345/426

OTHER PUBLICATIONS

Glassner, A. S. 1988. Spacetime Ray Tracing for Animation. IEEE Comput. Graph. Appl. 8, 2, 60-70.*
Shevtsov, M., Soupikov, A., and Kapustin, A. 2007. Highly Parallel Fast KD-tree Construction for Interactive Ray Tracing of Dynamic Scenes. Computer Graphics Forum 26, 3 (Sep.), 395-404.*
Wald, I. 2007. On fast Construction of SAH based Bounding Volume Hierarchies. In Proceedings of the 2007 Eurographics/IEEE Symposium on Interactive Ray Tracing.*
Ernst, M., and Greiner, G., "Early Split Clipping for Bounding Volume Hierarchies," Proceedings Eurographics/IEEE Symposium on Interactive Ray Tracing, 2007, 73-78.
Dammertz, H., and Keller, A., "The Edge Volume Heuristic -Robust Triangle Subdivision for Improved BVH Performance," IEEE Symposium on Interactive Ray Tracing, 2008, 155-158.

Amanatides, J., et al., "A fast voxel traversal algorithm for ray tracing," In In Eurographics, 1987, vol. 87, pp. 3-10.
Apodaca, T. et al., "Using RenderMan in animation production," ACM Siggraph 1995 Course 4, Aug. 7, 1995, www.renderman.org/RMR/Publications/sig95.course04.pdf.
Christensen, P., "Ray tracing for the movie 'Cars'," In Proceedings of the IEEE Symposium on Interactive Ray Tracing 2006, 2006, pp. 1-6.
Hanika, J. et al., "Two-level ray tracing with reordering for highly complex scenes," In Proceedings of Graphics Interface 2010, 2010, pp. 145-152.
Hou, Q. et al., "Micropolygon ray tracing with defocus and motion blur," In ACM Siggraph 2010 papers, pp. 64:1-64:10.
Hunt, W., "Corrections to the surface area metric with respect to mail-boxing," In Proceedings of the IEEE Symposium on Interactive Ray Tracing 2008, 2008, pp. 77-80.
Lauterbach, C. et al., "RT-DEFORM: Interactive ray tracing of dynamic scenes using BVHs," Symposium on Interactive Ray Tracing, 2006, pp. 39-46.
Munkberg, J. et al., "Efficient bounding of displaced Bezier patches," 2010, pp. 1-10.

(Continued)

*Primary Examiner* — Ulka Chauhan
*Assistant Examiner* — Sultana M Zalalee
(74) *Attorney, Agent, or Firm* — Zilka-Kotab, PC

(57) ABSTRACT

A system and method for constructing a bounding volume hierarchical structure are disclosed. The method includes defining a parent node for the bounding volume hierarchical structure, the parent node including a parent node bounding volume enclosing a plurality of objects. A first cost is computed for performing an object partition of the parent node bounding volume to produce a first plurality of child node bounding volumes, and a second cost is also computed for performing a spatial partitioning of the parent node bounding volume to produce a second plurality of child node bounding volumes. The bounding volume hierarchical structure is constructed employing the second plurality of child node bounding volumes produced from the spatial partitioning of the parent node bounding volume if the second cost is lower than the first cost.

23 Claims, 11 Drawing Sheets

OTHER PUBLICATIONS

Olsson, J., "Ray-Tracing Time-Continuous Animations using 4D KD-Trees," Master's thesis, Lund University, Apr. 21, 2007, pp. 1-30.

Pharr, M. et al., "Physically Based Rendering: From Theory to Implementation," Morgan Kaufmann Publishers Inc., 2nd edition, pp. 1-1167.

Soupikov, A., et al., "Improving kd-tree quality at a reasonable construction cost," IEEE/EG Symposium on Interactive Ray Tracing 2008 Aug. 9-10, 2007, pp. 67-72.

Stich, M. et al., "Spatial splits in bounding volume hierarchies," in Proceedings of the Conference on High Performance Graphics 2009, 2009, pp. 7-13.

Sutherland, I. et al., "Reentrant polygon clipping," Graphics and Image Processing, Communications of the ACM, vol. 17, No. 1, Jan. 1974, pp. 32-42.

Wachter, C. et al., "Terminating spatial hierarchies by a priori bounding memory," In Proceedings of the IEEE Symposium on Interactive Ray Tracing, 2007, pp. 41-46.

Wald, I. et al., "State of the art in ray tracing animated scenes," In Eurographics 2007 State of the Art Reports, 2007.

Wald, I. et al., "On building fast kd-Trees for Ray Tracing, and on doing that in O(N log N)," In Proceedings of the IEEE Symposium on Interactive Ray Tracing, 2006, pp. 61-69.

* cited by examiner

SYSTEM AND METHOD FOR CONSTRUCTING A BOUNDING VOLUME HIERARCHICAL STRUCTURE

BACKGROUND

The present invention relates to the hierarchical structures, and in particular to systems and methods for constructing bounding volume hierarchical structures.

Hierarchical structures, such as logical tree structures, are known in many technical fields, and are employed to organize information in a logical form to facilitate storage and retrieval of the information. In a typical implementation, the highest node or "root" of the logical tree includes the most general information, with descendant nodes (i.e., child nodes, grandchild nodes, etc. moving away from the root node) providing additional detail as to a particular aspect of the information represented by the tree structure. It is, or course, desirable to navigate through the tree via the shortest path and/or in the shortest amount of time in order to store or retrieve information, and techniques for constructing a hierarchical structure which minimizes the time to traverse the tree occupies engineers and scientists from a variety of different fields.

In the areas of graphics processing and rendering, ray tracing is a field which uses hierarchical structures for organizing information. Ray tracing involves a technique for determining the visibility of an object (e.g., a geometric primitive) from a given point in space, for example, an eye, or camera perspective. Primitives of a particular scene which are to be rendered are typically located in nodes, and the nodes organized within a hierarchical tree. Ray tracing involves a first operation of "node traversal," whereby nodes of the tree are traversed in a particular manner in an attempt to locate nodes having primitives, and a second operation of "primitive intersection," in which a ray is intersected with one or more primitives within a located node to produce a particular visual effect.

Preliminary to node traversal and primitive intersection testing, the hierarchical structure is built to efficiently organize the objects, the hierarchical structure constructed by partitioning a higher level node (e.g., a parent node) into two or more lower level nodes (e.g., child nodes), each child node defining a successively smaller space or including successively fewer objects compared to the parent node. The partitioning process is repeated for each of the child nodes, whereby each child is further partitioned into two grandchild nodes, each grandchild node defining a successively smaller space or including successively fewer objects as the child node from which it originates. The process repeats until the last generate of nodes include a single object.

Conventionally, the construction of hierarchical structures employs one of two different types of partitioning techniques: spatial partitioning or object partitioning. Spatial partitioning involves recursively subdividing a given space and distributing the geometric primitives into the resulting partitions. Each primitive is inserted into all partitions it overlaps, potentially resulting in multiple references for a primitive. This process is repeated until some termination criterion is met. K-dimensional trees (kD-trees) represents one type of hierarchical structure which employs this spatial partitioning technique. In particular, kD-trees implement binary spatial partitioning using one axis aligned plane per node. An advantageous property of kD-trees is their ability to adapt to arbitrary scenes with highly varying geometric densities, thereby providing excellent culling efficiency even in difficult settings. A disadvantage of kD-trees is that they suffer from high memory consumption due to deep trees and high primitive/reference duplication.

Object partitioning represents a second technique, whereby objects are recursively divided into disjoint sets. The sets are stored in bounding volumes represented as nodes of the hierarchical tree, with the bounding volumes having arbitrary overlap with each other. Such overlapping regions are expensive during traversal, because rays that intersect these regions must traverse each node which contributes to the overlap, i.e., a ray must visit each node to test for an intersection with an object therein. Advantageously, bounding volumes can be handled very efficiently and in most cases enclose primitives reasonably well. Since in a conventional BVH each primitive is referenced exactly once, the hierarchies consist of fewer nodes than kD-trees for virtually all scenes.

As can be understood from the foregoing, each of the spatial and object partitioning techniques used in constructing hierarchical structures has benefits, and what is needed is to develop a system and corresponding method for constructing a hierarchical structure which combines the advantages of both.

SUMMARY

The present invention addresses the foregoing through the implementation of a new method and system for constructing a bounding volume hierarchical structure. In an exemplary embodiment, the new method includes defining a parent node for the bounding volume hierarchical structure, the parent node including a parent node bounding volume enclosing a plurality of objects. A first cost is computed for performing an object partition of the parent node bounding volume to produce a first plurality of child node bounding volumes, and a second cost is further computed for performing a spatial partitioning of the parent node bounding volume to produce a second plurality of child node bounding volumes. The bounding volume hierarchical structure is constructed employing the second plurality of child node bounding volumes produced from the spatial partitioning of the parent node bounding volume if the second cost is lower than the first cost.

DETAILED DESCRIPTION OF EXEMPLARY EMBODIMENTS

Figure 1:
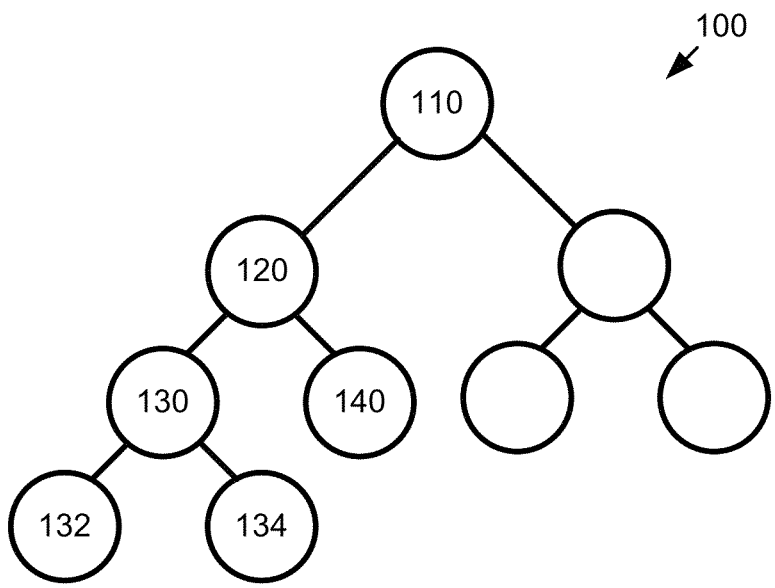
FIG. 1 illustrates an exemplary bounding volume hierarchical structure constructed in accordance with the present invention.

FIG. 1 illustrates an exemplary bounding volume hierarchical structure 100 constructed in accordance with the present invention. The BVH structure 100 (exemplary implemented as a data structure) includes a root node (or zero generation) 110, a first generation node 120, second generation nodes 130 and 140, and third generation nodes 132 and 134 from second successor node 130. Each node represents a bounding volume which encloses one or more objects, with successive generation bounding volumes defining successively smaller bounding volumes. In an exemplary embodiment referred to herein, the first generation node 170 is a parent node, second generation nodes 180 and 190 are child nodes of the parent node 170, and third generation nodes 182 and 184 are grandchild nodes of the parent node 170, although other arrangements as to which node is a parent node may of course be alternatively defined. The bounding volumes representing each node may be of any particular geometry, for example, a bounding box, sphere, ellipsoid, cylinder, rectangle, discrete oriented polytype, convex hull, or other geometries. The term "parent/child/grandchild node bounding volume" is used to refer to the bounding volume which the particular node represents.

The present invention enables construction of the BVH structure 150, whereby child node BVs produced from either an object partition or spatial partition of a parent node BV may be implemented to build the BVH structure depending upon which partition technique provides the lowest cost. The invention permits construction of a hybrid-partitioned BVH structure is possible in which object- and spatially-partitioned child nodes are implemented, combining the low memory footprint and fast construction benefits of a BVH structure, but performs well even in cases where k-dimension trees previously performed superior.

Figure 2:
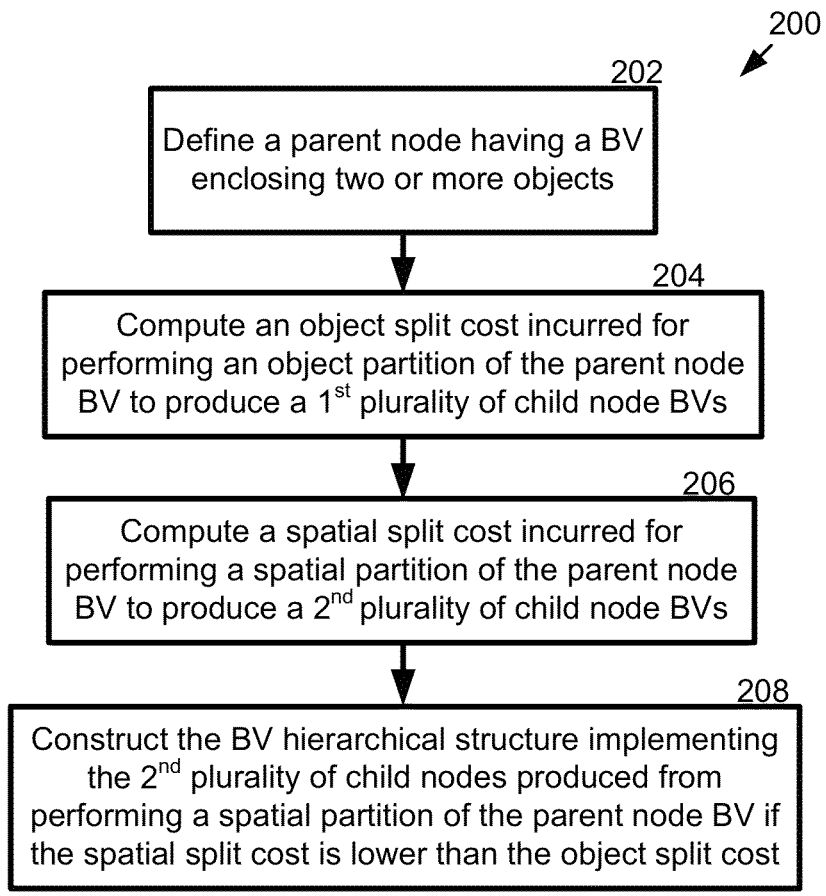
FIG. 2 illustrates a first exemplary method for constructing a bounding volume hierarchical structure in accordance with the present invention.

FIG. 2 illustrates a first exemplary method 200 for constructing a bounding volume hierarchical (BVH) structure in accordance with the present invention. At 202, a parent node bounding volume (parent node BV) is defined, the parent BV enclosing a plurality of objects. The number of objects may range from two objects to tens of thousands, or millions of objects, or more. In one embodiment, the parent node is the root node of the BVH. In another embodiment, the parent node is an internal node of the BVH, i.e., a node located between a predecessor node (e.g., the root node) and a successor node (e.g., a child or grandchild node). As used herein, the term "object" refers to geometric primitives typically employed in ray tracing applications, for example, triangles, polygons, higher-order surfaces, spheres, lines, and other geometric structures.

At 204, a first cost is computed for performing an object partition of the parent node BV. The first cost, referred to herein as an "object split cost," may be computed using a variety of techniques, for example, using a surface area heuristic (SAH) cost function described by J. Goldman and J. Salmon in "Automatic Creation of Object Hierarchies for Ray Tracing in IEEE Computer Graphics and Applications," May 1987. The cost may be computed after an object partitioning of the parent node BV is performed. For example, several different object partitionings may be performed to determine the lowest cost object partition of the parent node BV, and that cost taken as the computed object split cost obtained at 204. In another embodiment, an approximate is performed to compute the object split cost. In such an embodiment, fewer than the actual number of objects may be used to compute the object split cost. The object partitioning of the parent node BV results in the production of a (first) plurality of child node BVs, which in an exemplary embodiment, number two child node BVs, although any number can be generated in an N-ary system.

At 206, a second cost is computed for performing a spatial partition of the parent node BV. In an exemplary embodiment, operation 206 can be performed by identifying a plane intersecting the parent node bounding volume and performing a spatial partition along the identified split plane to produce first and second child node bounding volumes. Each object within parent node bounding volume is assigned to at least one of the first and second child node bounding volumes. Alternatively, fewer than all of the objects may be assigned, similar to the sampling approach possible with the object partition approach, described above. The second cost, referred to herein as a "spatial split cost," can then be computed based upon the first and second child node bounding volumes and the one or more parent node objects assigned within each child node BV. Along these lines, a SAH cost function can be used to compute the spatial split cost, an example of which is disclosed by M. Ernst and G. Greiner in "Early Split Clipping for Bounding Volume Hierarchies," Proceedings Eurographics/IEEE Symposium on Interactive Ray Tracing, 2007, pgs. 73-78, the contents of which are herein incorporated by reference.

In another embodiment, operation 206 is performed using a chopped binning process in which spatially-partitioned portions of the parent node BV are individually tallied, and bins to each of the left or right of the split plane are collectively used to compute a total cost for the spatial split. This process is further described and illustrated below.

Further alternatively, a plurality (two or more) of candidate costs are computed for spatially partitioning the parent node BV at each one of a respective plurality of different split planes, and the lowest of such costs is determined as the spatial split cost. An example of this process is also described and illustrated below. The spatial partitioning of the parent node BV and a split cost computation therefor results in the production of a (second) plurality of child node BVs, which in an exemplary embodiment, number two child node BVs, although any number can be generated in an N-ary system.

At 208, the BVH is constructed implementing the second plurality of child node BVs produced from the spatial split of the parent node BV if the spatial split cost is lower than the object split cost.] Importantly, the child node BVs of a spatial split are not necessarily equal to the parent BV divided by the split plane. The node child BVs are computed based on the objects that are assigned to them, and thus may in some embodiments be smaller than the divided parent node BV.

In a further embodiment of the invention, construction of the BVH structure includes implementing a plurality of grandchild nodes. In such an embodiment, for a particular child node that includes a child node bounding volume enclosing a plurality of objects, the method further includes computing a third cost for performing an object partitioning of the particular child node bounding volume to construct a first plurality of grandchild node bounding volumes, and a fourth cost for performing a spatial partitioning of the particular child node bounding volume to construct a second plurality of grandchild node bounding volumes. The BVH structure is constructed implementing the second plurality of grandchild node bounding volumes produced from spatially partitioning the particular child node bounding volume if the fourth cost is lower than the third cost.

Figure 3A:
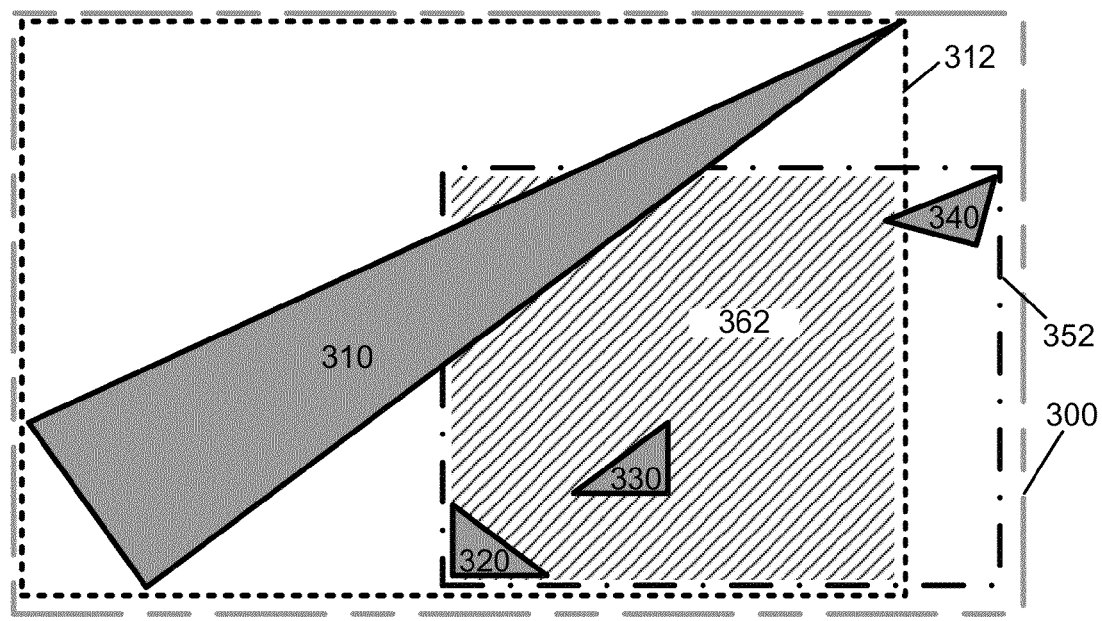
FIG. 3A illustrates object portioning of a parent node bounding volume in accordance with the method of FIG. 1.

FIG. 3A illustrates an object portioning of a parent node bounding volume in accordance with the method of FIG. 1. The parent node BV 300 includes four objects (exemplary illustrated as triangles) 310, 320, 330 and 340. Object partitioning of the parent node BV 300 groups the objects 310, 320, 330 and 340 into disjoint sets of enclosed by respect bounding volumes, which results in child node BV 312 enclosing object 310 and BV 352 enclosing objects 320, 330 and 340. As can be seen, the first and second child node BVs have a significant overlap area 362 in terms of the overall area of the parent node BV 300. Accordingly, the object split cost is expected to be relatively high.

Figure 3B:
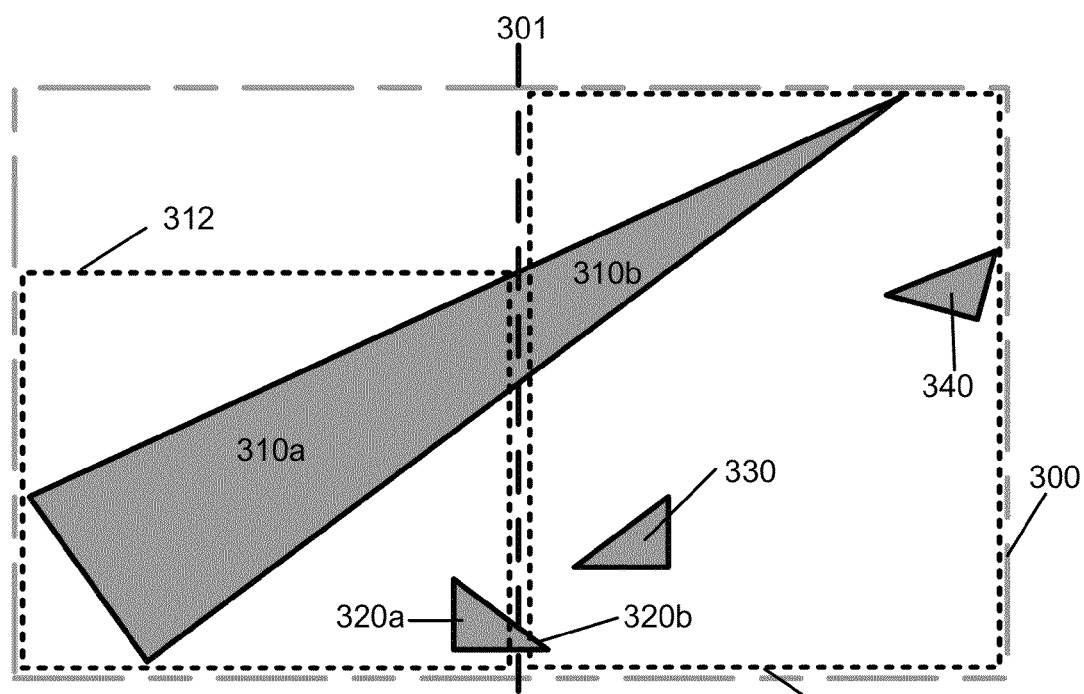
FIG. 3B illustrates spatial partitioning of a parent node bounding volume in accordance with the method of FIG. 3A.

FIG. 3B illustrates a spatial partitioning of a parent node bounding volume in accordance with the method of FIG. 3A, with previously identified features retaining their reference indices. For a spatial partition along a split plane 301, first and second child node bounding volumes 312 and 352 are formed. In particular, the first child node BV includes object 310a and object 320b (as referred to herein, the term "object" refers to an undivided body 310, as well as a divided portion thereof 310a, 310b). The second child node BV includes objects 310b and 320b, as well as objects 330 and 340. Computing the spatial split cost for performing the spatial partition illustrated in FIG. 3B can be performed using a SAH cost function, as described in the aforementioned reference to M. Ernst and G. Greiner. In particular, the SAH cost function can be implemented to determine a split cost C:

$$C = |P_1| \frac{SA(B_1)}{SA(B_P)} + |P_2| \frac{SA(B_2)}{SA(B_P)}$$

where:

$|P_1|$, $|P_2|$ are the number of objects are included within the first and second child node BVs, and $SA(B_1)$, $SA(B_2)$ and $SA(B_P)$ are the surface areas for the first child, second child and parent node BVs, respectively.

Accordingly, the cost of a parent node's spatial split can be determined given the surface area of the parent node and the child node bounding volumes created by the split, as well as the number of objects included within each child node's BV.

Figure 4A:
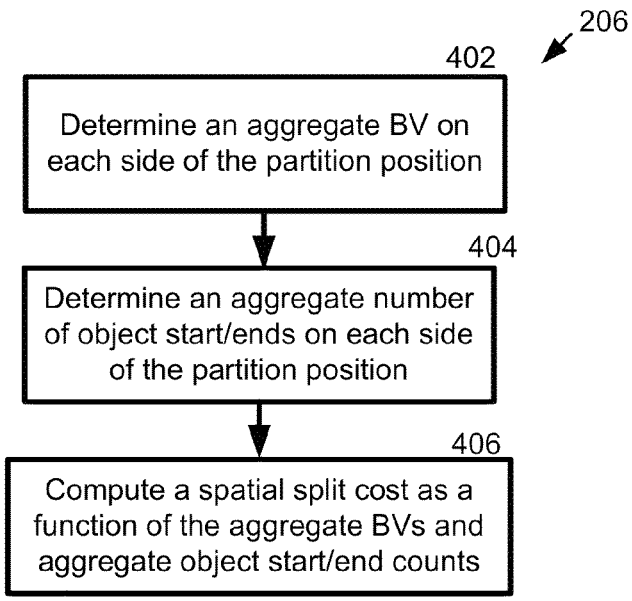
FIG. 4A illustrates computing a spatial split cost in accordance with the present invention.

FIG. 4A illustrates an alternative embodiment of operation 206 in which a spatial split cost is computed in accordance with the present invention. In this technique, referred to as "chopped binning," a bin is defined on each side of the split plane. The bin implements two parameters, a bin volume and an object start/end counter. The bin volume references a portion of the parent node BV which is located on a corresponding side of a split plane. The object start/end counter tallies the number of object starts or object ends per bin. Each of these parameters is described in greater detail below.

At 402, an aggregate BV on each side of the split plane 301 is computed. This process involves computing a bounding volume for each bin, and combining all bin volumes on the same side of the split plane to form an aggregate BV for that side of the split plane. In one embodiment of the invention described in FIGS. 5A-5C, one split plane is employed over the parent node BV, and thus one bin is formed on each side of the split plane. Each bin represents objects included within a corresponding portion of the parent node BV, that portion extending between the split plane and a boundary of the parent node BV. In another embodiment illustrated in FIGS. 6A-6D, multiple split planes are implemented over the parent node BV, resulting in multiple bins formed on one or both sides of the split plane. In this embodiment, each bin references objects included within a portion of the parent node BV that is located (i) between adjacent split planes, or (ii) between a split plane and a boundary of the parent node BV. Each of the embodiments is described below.

Each object of the parent node BV is referenced of assigned to a particular bin and enclosed by a sub-bounding volume with the bin. The individual sub-bounding volumes are combined (e.g., via a union operation) to provide a bin volume. The bin volumes occurring on the same side of the split plane 301 are also combined to form an aggregate bounding volume for each side of the split plane 301. For objects which are partitioned (e.g., objects 310 and 320 in FIG. 3B), the process includes referencing the undivided object, and clipping the undivided object against the initial child node BVs to form respective clipped objects. These clipped objects are then assigned to their respective child node bounding volumes. Within each bin, each object (clipped or whole) is enclosed by a corresponding sub-bounding volume, which contributes to the bin volume.

At 404, an aggregate count as to the number of object starts/ends on either side of the split plane is determined. As used herein, an object's "start" and "ending" refers to extreme points of the object. As an example, the object's left most extreme point can be defined as the object's "start," and the object's right most extreme position can be defined as that object's "ending." In an alternative embodiment, the aforementioned positions can be juxtaposed for defining start and ending points of the object. Further alternatively, the object's top most or bottom most extreme points can be used for either of the start and ending points.

The number of object starts and endings enables tracking as to the number of objects residing within each bin located on either side of the split plane, each side of the split plane corresponding to a child node BV of the original parent node BV. For example, a bin which has a count of one object start and one object ending may include an entire object within that bin. Further, the total number of objects included within the parent node can be known by determining the total number of starts and endings, as each object has one start and one end associated with it. While the split plane is illustrated oriented along a y-z plane of the figure (in the figure, the x-plane is oriented horizontally, the y-plane vertically, and the z-plane normally into the figure), the split plane may also be oriented along a x-y plane of the figure, in which case the bins would be oriented above/below one another as opposed to left/right in the illustrated embodiment.

At 406, the spatial split cost is computed based upon the aggregate BV and aggregate count. In a particular embodiment, a SAH cost function is used to determine a cost of the spatial split at the split plane based upon each bin's aggregated BV and an aggregate number of the start/end counts. In particular, a collective number of object starts are tallied on one side of the split plane and a collective number of object ends are tallied on the opposite side of the split plane. In the illustrated embodiment, the sum of object starts on the split plane's left side yields the number of objects assigned to the left child BV, and the sum of object ends on the right side yields the number of objects assigned to the right child BV. These totals, along with the opposing sides' aggregate BVs are applied to a SAH cost function to provide a split cost for partitioning the parent node BV at the split plane. The foregoing computation is specific to the object's left and right extreme positions being defined as the object's start and end points, respectively. Other definitions as to an object's start/ending position will yield another computation as to which of the start and end counters are to be used to determine the number of objects included within a specific child node BV. For example, if the start/end orientation were reversed, the object end counter would be used to determine the number of objects left of the split plane and the object start counter would be used to determine the number of objects right of the split plane.

Figure 4B:
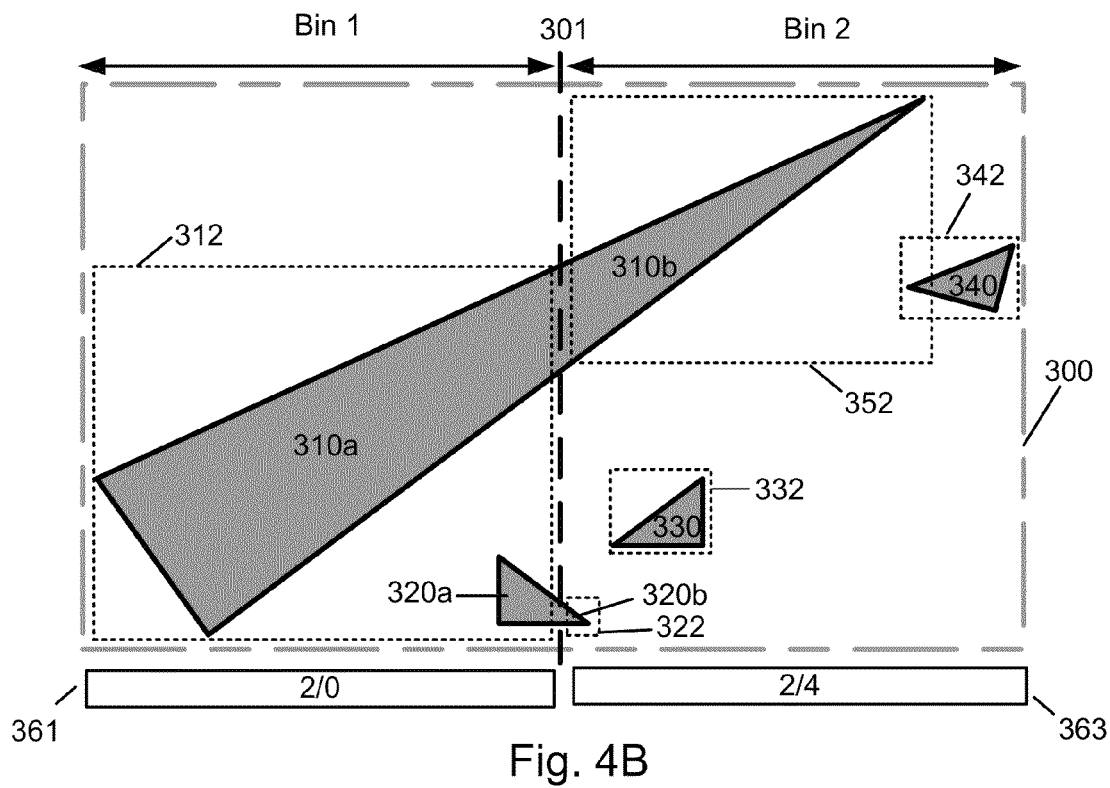
FIG. 4B illustrates the formation of bins within a parent node boundary volume in accordance with the method of FIG. 4A.

FIG. 4B illustrates the formation of bins within a parent node boundary volume in accordance with the method of FIG. 4A. Bins 1 and 2 correspond to first (left) and second (right) child node BVs which are produced when the parent node 300 is spatially partitioned along the split plane 301.

Operation 402 is carried out in accordance with the process described above, whereby a clipped object 310a is formed by referencing object 310 (via a pointer or index) and clipping it against an initial child node BV that extends from the partition position 301 to the left most boundary of the parent node BV. Clipped object 320a is formed in the same manner as 310a, and both clipped objects 310a and 320a are assigned to the initial child node BV corresponding to Bin 1.

Once clipped objects 310a and 320a are assigned to the initial child node BV, the initial child node BV is modified, such modification in the particular example of Bin 1 being that the initial child node BV is reduced to form a sub-bounding volume 312 which more tightly encloses the objects present within Bin 1. The x-y dimensions of clipped object 310a are such that sub-BV 312 overlaps with object 320a, and thus a second sub-BV is not formed around 320a, i.e., a sub-BV formed around 320a would not extend the sub-BV 312. The sub-BV 312 is the sole bounding volume for Bin 1, and thus it represents the bin volume for Bin 1 (and the aggregate BV for the left side of the split plane 301). In the illustrated embodiment, the initial child node BV is modified by reducing its volume to more tightly enclose objects present within it. In alternative embodiments further described below, the initial child node BV is modified by decomposing into a plurality of different sub-BVs to enclose objects present therein.

Operation 402 in the context of Bin 2 is carried out in a similar manner, whereby objects 310b and 320b are formed by referencing objects 310 and 320 (via a pointer or index) and clipping each against an initial second child node BV that extends from the partition position 301 to the right most boundary of the parent node BV. Objects 330 and 340 are also formed by referencing these objects from the parent node BV, although their formation does not require a clipping operation. Once all objects are formed and assigned to the initial second child node BV, the initial second child node BV is modified, which in this instance constitutes decomposing the bounding volume into several different sub-bounding volumes 322, 332 and 352. In particular, object 320b is enclosed by sub-BV 332, object 20 enclosed by a sub-BV 332, and objects 320b and 340 enclosed by a sub-BV 352. Accordingly, the bin volume of Bin 2 (and the aggregate BV for the right side of the split plane 301) would be the union of sub-BVs 322, 332 and 352.

Operation 404 is carried out in accordance with the process described above, whereby a first object start/end counter 361 tallies the total number of object starts/ends left of the split plane 301, and a second object start/end counter 361 tallies the total number of object starts/ends right of the split plane 301. The first counter 361 totals two object starts, corresponding to the left most points of objects 310 and 320 included within the first child node BV in clipped objects 310a and 320a. The second counter 363 totals two object starts and four object ends. The two object starts and two of the four object ends correspond to the left most and right most points of objects 330 and 340, and the remaining two of the four object ends correspond to the right most points of object 310 and 320.

Operation 406 can be carried out by applying the total number of object starts and endings and the child node BVs to the SAH cost function to produce a cost function of the split plane implemented. In the illustrated embodiment, the collective number of object starts tallied in the left counter indicates the number of object within the left child node BV, this number defining the quantity $|P_1|$ of the SAH cost function described above. Similarly, the collective number of object ends tallied in the right counter indicates the number of objects within the right child node BV, this number defining the quantity $|P_2|$. The left and right aggregate BVs corresponding to the left and right child node BVs define the quantities $SA(B_1)$ and $SA(B_2)$, respectively, and the known parent node BV defines the quantity $SA(B_p)$. The cost function can therefore be computed for the particular split plane.

Figure 5A:
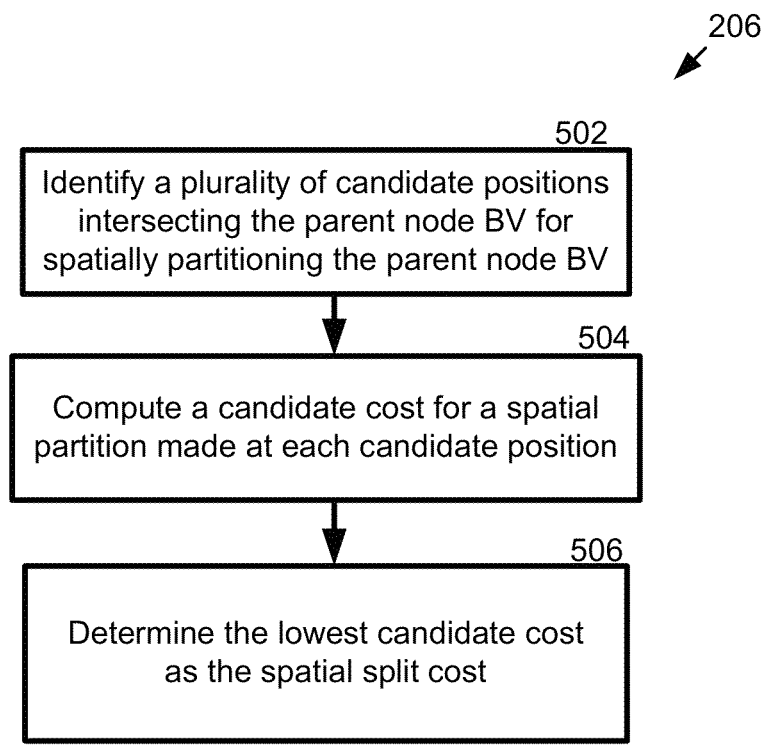
FIG. 5A illustrates a method for computing a spatial split cost in accordance with the present invention.

FIG. 5A illustrates a further method for computing a spatial split cost is computed in accordance with the present invention. This approach represents an extension of the method illustrated in FIG. 4A, in which a plurality of candidate split planes are identified, and a candidate cost is computed for each candidate split plane. The candidate split plane providing the lowest split cost is selected for providing the spatial partitioning of the parent node BV to produce the child node BVs.

At 502, a plurality of candidate split planes for spatially partitioning the parent node BV is identified. The number of candidate split planes may range from 2 to any integer number, for example, 3, 4, 8, 10, 20, 50, 100, 500, 1,000, or more. The number of candidate split planes employed may be selected to strike a optimal balance between speed and quality of the hierarchy, as a smaller number of candidate split planes will provide greater construction speed, and a larger number of candidate split planes provides the possibility of constructing a higher quality hierarchy.

At 504, a candidate cost is computed for performing a spatial partition made at each of the aforementioned candidate split planes. In a particular embodiment, the candidate cost is computed using a SAH cost function, as described above. In another embodiment, the chopped binning technique described and illustrated above (exemplary shown in operation 406) is implemented to restrict evaluation of an applied SAH cost function at each of the different candidate split plane positions.

At 506, the lowest candidate cost is determined and assigned as the spatial split cost for the spatial partition of the parent node BV, wherein the overall BVH structure is constructed implementing the child node BVs that are produced from the candidate split plane producing the lowest candidate cost. In an exemplary embodiment, a comparison of all candidate costs is performed to determine the lowest thereof, although the comparison may involve fewer than all of the candidate costs if desired.

Operation of 502 may be performed in a variety of manners, for example, by identifying an equally-spaced distribution of candidate split planes along a plane of the parent node BV. Any type of distribution of candidate split planes may be alternatively employed. Further alternatively, the identification may be intelligent, i.e. the subsequent identification of candidate split planes is attempted which provides an improved result, compared to a result obtained for an earlier identified candidate split plane. Such an improved result may be, for example, a lower split cost. Other parameters may also be used, for example, an improved balance between opposing sides' aggregate BVs, or an improved balance between opposing sides' object starts versus object endings.

While the described operations are described in a "batch" mode in which all of the candidate positions are identified at 502 and all of the costs therefor are computed at 404, the operations of 502 and 504 may be performed sequentially, whereby a first candidate position is determined, and subsequently a first candidate cost computed therefor, these operations repeated for a subsequent candidate position.

As an exemplary embodiment of the operations 502, 504, 506, reference is made to previous FIGS. 4A and 4B, where the split plane 301 is identified as a first candidate split plane for partitioning the parent node BV 301, and the first candidate split cost computed therefor. The first candidate split plane 301 partitions objects 310 and 320, and thus each of these objects will need to be referenced (i.e., copied to some degree) into each of the child node BVs, adding overlap and inefficiency to the BHV structure.

It can be further noted that for Bin 1 left of the first candidate split plane 301 (FIG. 4B), the bin volume (and the aggregate BV for the left side of split plane) is the sub-BV 312, and the object start/end count is 2/0. For Bin 2 right of the first candidate split plane 301, the bin volume (and the aggregate BV for the right side of the split plane) extends substantially the full area of the initial child node BV (due to the x-y locations of the ends of 310b, 320 and 340), and the object start/end count is 2/4.

In a particular embodiment of the invention, operations 502 and 504 are repeated for a second candidate split plane, and a cost for spatially-partitioning the parent node BV 300 therealong is computed. As noted above, the second candidate position may be either predefined (e.g., by means of a previously-defined distribution pattern) or identified intelligently, as described above.

Figure 5B:
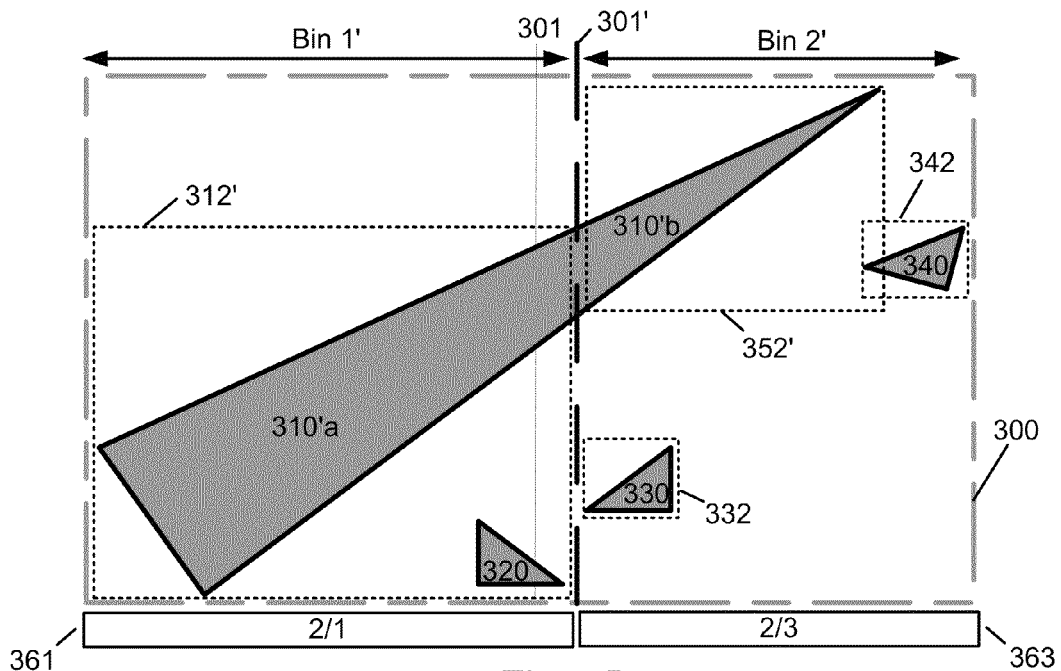
FIG. 5B illustrates the implementation of a second candidate split plane for spatially partitioning a parent node bounding volume in accordance with the method of FIG. 5A.

FIG. 5B illustrates the implementation of a second candidate split plane 301' for spatially partitioning the parent node BV 300 in accordance with the method of FIG. 5A, with previously-identified features retained for clarity. As shown, the second candidate split plane 301' is identified right of the first candidate split plane 301, such that the previously-traversed object 320 is completely included in the first (left) child node BV and does not extend into the second (right) child node BV.

Bin 1' represents a modified version of Bin 1 of FIG. 4B, whereby the bin volume (sub-BV 312') is increased, as the left most boundary has not changed, and the split plane has moved further right and the object 310 is oriented upwards. Additionally, the counter 361 of the modified Bin 1' is updated to an object start/end count of 2/1, as the end count corresponding to object 320 is now included in the first modified bin.

Bin 2' represents a modified version of Bin 2 of FIG. 4B, whereby the bin volume has decreased, as it will be the combined volumes of sub-BVs 332 and 352' (sub-BV 352' itself modified from sub-BV 352 due to the change in the split plane), and the former sub-BV 322 is removed in the modified aggregated BV for Bin 2'. Thus, the bin volume for modified Bin 2' will extend downward to include sub-BV 332 and laterally from the split plane 301' to the right boundary of the parent node BV 300. The counter 363 is updates to an object start/end count of 2/3, as the end count corresponding to object 320 is now removed from the second modified bin.

In a particular embodiment, only the aggregate BV for the partition side which expands (bin volume of Bin 1') is re-computed, and the aggregate BV for the opposing side (bin volume for of Bin 2') is not re-computed. This may be done, e.g., to provide a worst-case computation of the split cost, and/or to avoid re-computing the smaller aggregate BV for one of the opposing sides. Often times, the object which is captured into one of the child node BVs is not the only such situated object, and thus other situated objects will prevent the other child node BV from reducing its aggregate BV.

In a particular embodiment, a third or more candidate split planes may also be identified for spatially partitioning the parent node BV 300. In such an instance, the aforementioned operations 502 and 504 are repeated, and operation 506 may be performed as a last step by comparing all three of the first, second, and third candidate costs to determine the lowest one.

Figure 5C:
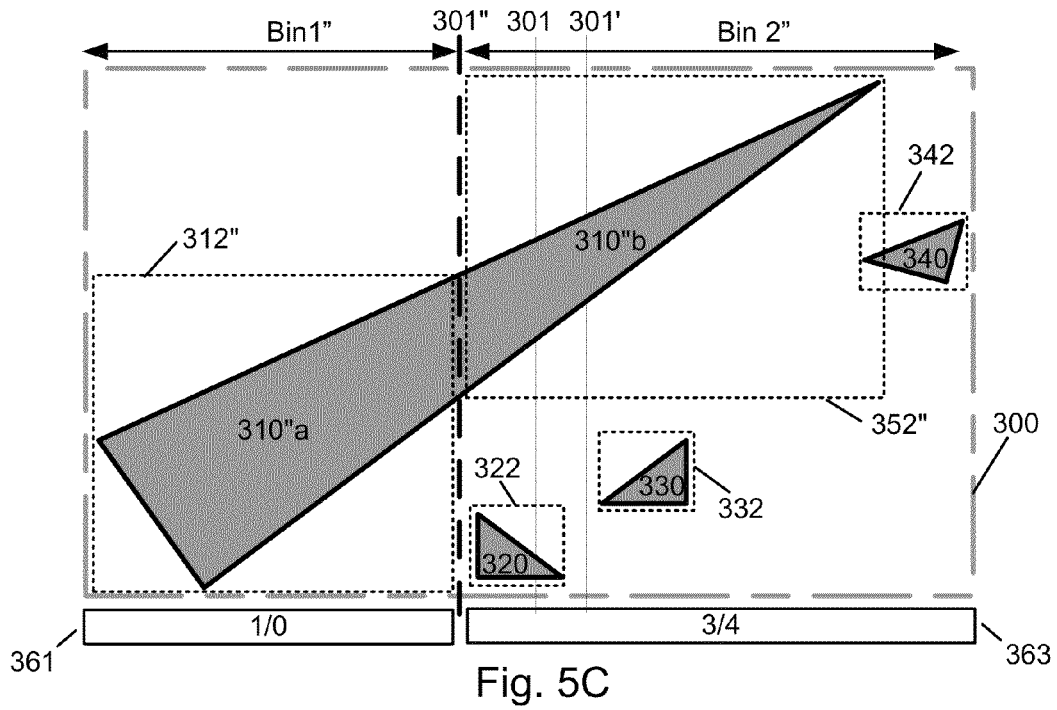
FIG. 5C illustrates the implementation of a third candidate split plane for spatially partitioning a parent node bounding volume in accordance with the method of FIG. 5A.

FIG. 5C illustrates the implementation of a third candidate split plane 301" for spatially partitioning the parent node BV 300 in accordance with the method of FIG. 5A, with previously-identified features retained for clarity. As shown, the third candidate split plane 301" is identified left of the first candidate split plane 301, such that the previously-traversed object 320 is completely included in the second (right) child node BV and does not extend into the first (left) child node BV.

Bin 1" represents a second modified version of Bin 1 of FIG. 4B, whereby it's bin volume (sub-BV 312") is decreased, as the split plane has moved to the left so that object 320 is completely included within Bin 2". Additionally, the counter 361 of the modified Bin 1" is updated to an object start/end count of 1/0, as the end count corresponding to object 320 is now removed from the second modified bin, and only the object start of 310a" is included therein.

Bin 2" represents a second modified version of Bin 2 of FIG. 4B, whereby its bin volume has increased, as the third candidate split plane 301" is moved left of the first candidate split plane 301. The sub-BV 352" is modified to enclose the enlarged version of clipped object 310"b, and the former sub-BV 322 is now completely included in the modified aggregated BV for Bin 2". Thus, the bin volume for modified Bin 2" will extend downward to include sub-BV 322 and laterally from the split plane 301' to the right boundary of the parent node BV 300. The counter 363 is updates to an object start/end count of 3/4, as the start count corresponding to object 320 is now included in the second modified bin.

As noted above, in some embodiments only the aggregate BV for the partition side which expands (bin volume of Bin 2") is re-computed, and the aggregate BV for the opposing side (bin volume for of Bin 1") is not re-computed.

The foregoing exemplary embodiments have illustrated the invention in terms of a two-bin split of the parent node BV, with one bin implemented on each partition side. The principles of the invention can be extended to employ multiple bins per side of the spatial split in order to provide several advantages, such as greater granularity in the computation of the bin volume and object start/end count parameters, and improves the quality of the constructed hierarchy.

Figure 6A:
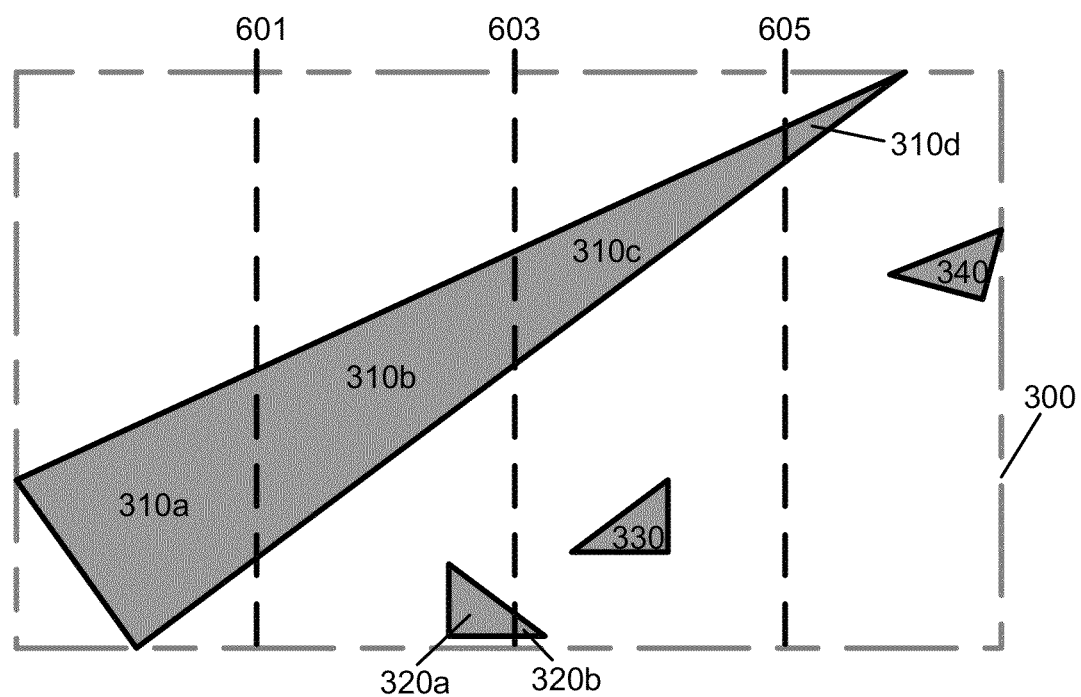
FIG. 6A illustrates a plurality of candidate split planes for spatially partitioning in accordance with the present invention.

FIG. 6A illustrates a plurality of candidate split planes for spatially partitioning a parent node BV in accordance with the present invention, with previously-identified features retained for clarity. The parent node BV 300 includes three candidate split planes 601, 603 and 605 and objects 310, 320, 330 and 340, which clipped objects 310a, 310b, 310c, 310d and 320a and 320b formed and assigned to respective child node BVs as described above in FIGS. 4A and 4B. While three candidate split planes are employed, any number of candidate split planes may be used.

Figure 6B:
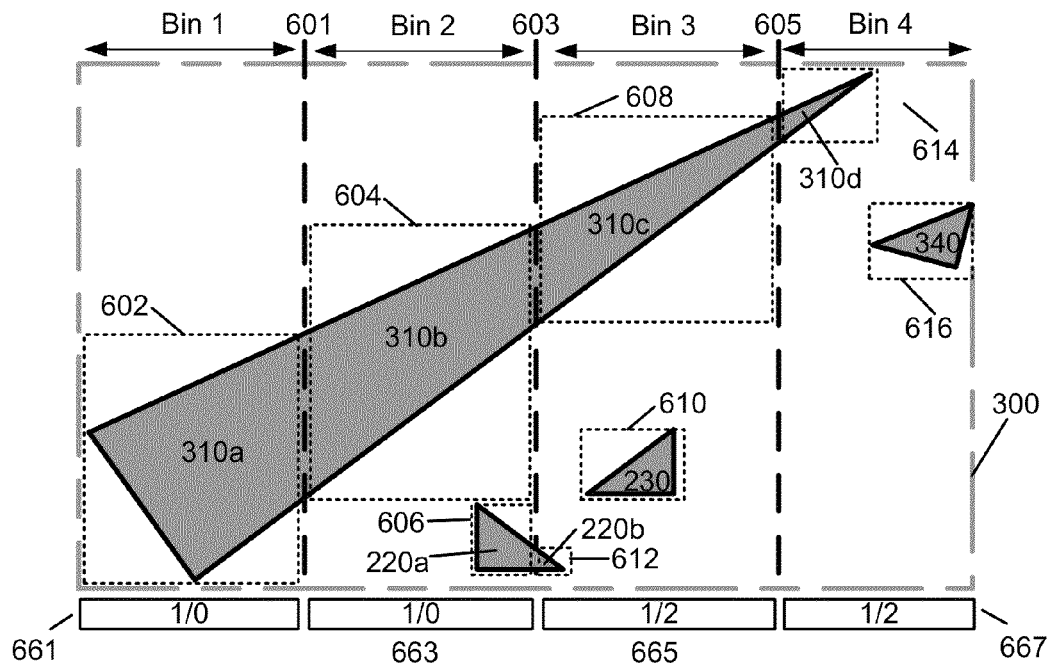
FIGS. 6B-6D illustrate the implementation three candidate split planes for spatially partitioning a parent node bounding volume in accordance with the present invention.
Figure 6C:
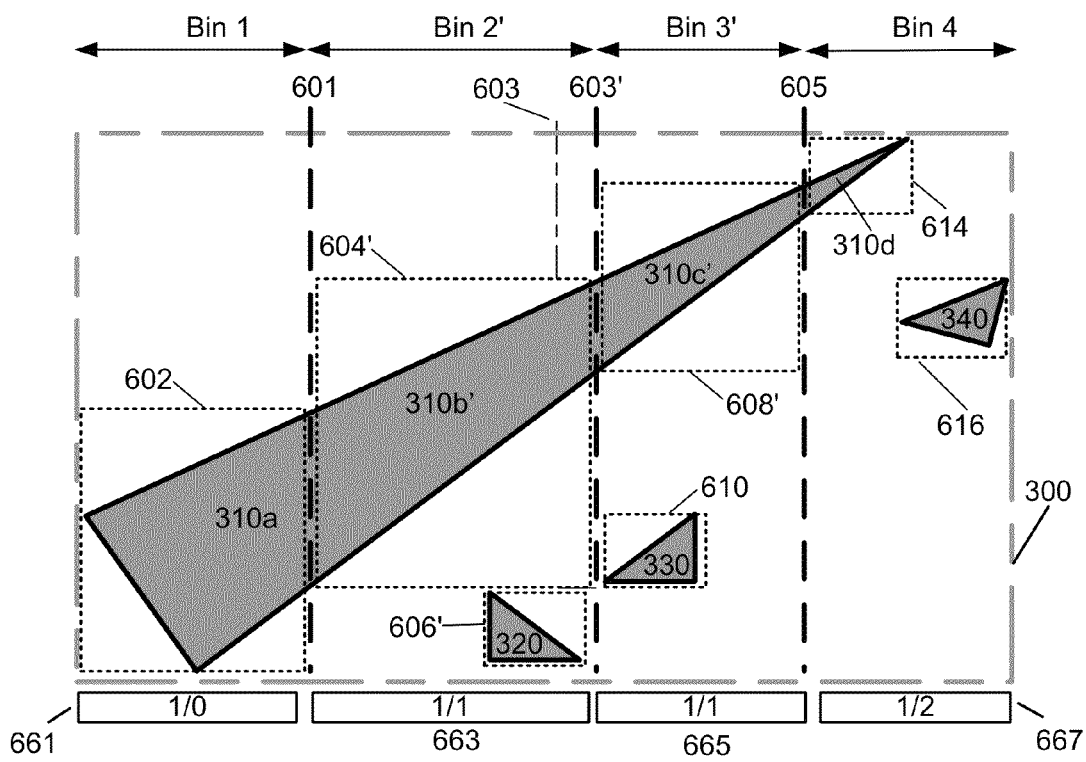
Figure 6D:
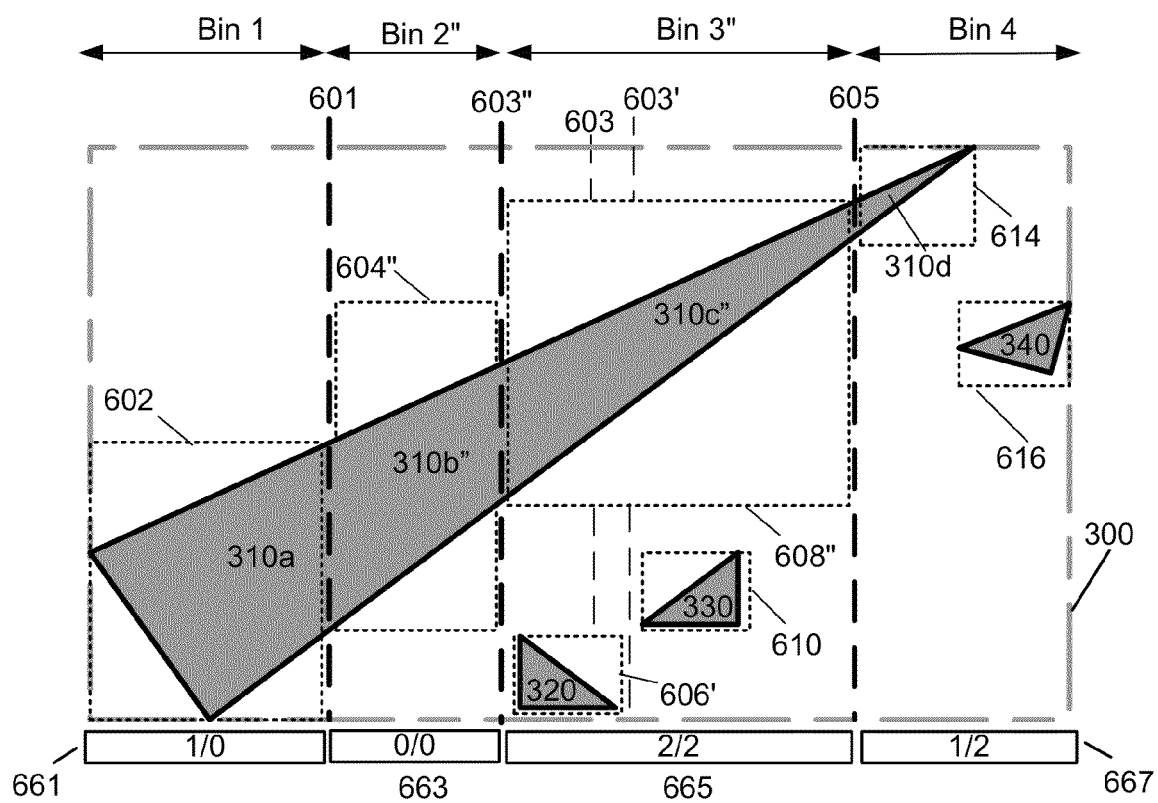

FIGS. 6B-6D illustrates the implementation of a three candidate split planes for spatially partitioning the parent node bounding volume 300 in accordance with the present invention.

FIG. 6B shows the implementation of the candidate split planes 601, 603 and 605. Bin 1 is defined as a left child node BV between the first candidate split plane 601 and the left boundary of the parent node BV 300, and a first object start/end counter 661. Bin 2 is defined as a child node BV (either left or right depending upon the candidate split plane employed) between the first and second candidate split planes 601 and 603, and a second object start/end counter 663. Bin 3 is defined as a child node BV (either left or right depending upon the candidate split plane employed) between the first and second candidate split planes 603 and 605, and a third object start/end counter 665. Bin 4 is defined as a right child node BV between the third candidate split position 605 and the right boundary of the parent node BV 300, and a fourth object start/end counter 667.

Each of the Bins 1-4 references (i.e., assigns) objects included within a corresponding portion of the parent node BV. In particular, Bin 1 references objects included in the parent node BV located between the first candidate split plane 601 and the left boundary of the parent node BV 300, Bin 2 references objects included within the parent node BV between the first and second candidate split planes 601 and 603, Bin 3 references objects included within the parent node BV between the second and third candidate split planes 603 and 605, and Bin 4 references objects included in the parent node BV between the third candidate split plane 605 and the right boundary of the parent node BV 300. Referencing (assigning) of the objects into Bins 1-4 is as described in FIGS. 4A and 4B and the corresponding description.

The operations of FIG. 5A can be employed to compute a candidate cost for spatially partitioning the parent node BV at each of the candidate split planes 601, 603 and 605. For example, a first candidate cost for partitioning the parent node BV 300 along the first candidate split plane 601 is computed as computing an aggregate BV from each side of the candidate split plane 601, and computing the total number of object starts/ends on each side of the first candidate split plane 601. These parameters for the first (left) child node BV are computed straight forwardly as only one bin (Bin 1) is involved; the bin volume of Bin 1 is shown as sub-BV 602, and the object start/end counter 661 is 1/0. These parameters for the second (right) child node BV requires combining the bin volumes and summing the object start/end counters for each of Bins 2-4. For the aggregate BV, sub-BVs 604, 606, 608, 610, 612, 614 and 616 are combined to form a aggregate BV. For the aggregate count of the object starts and endings, counters 663, 665 and 667 are added resulting in an aggregated count of 3/4. These parameters can be input into a SAH cost function, and a first candidate cost computed, as noted above.

A second candidate cost can be similarly computed for performing the spatial partition at the second candidate split plane 603. For the first (left) child node BV, the aggregate BV is the combination of sub-BVs 602 and 604, and the aggregate object start/end count is 2/0. For the second (right) child node BV, the aggregate BV is the combination of sub-BVs 608, 610, 612, 614 and 616, and the aggregate object start/end count is 2/4.

A third candidate cost can be similarly computed for performing the spatial partition at the third candidate split plane 605. For the first (left) child node BV, the aggregate BV is the combination of sub-BVs 602, 604, 608, 610 and 612, and the aggregate object start/end count is 3/2. For the second (right) child node BV, the aggregate BV is the combination of sub-BVs 614 and 616, and the aggregate object start/end count is 1/2. Once each of the three candidate costs are computed, they can be compared, and the split plane having the lowest cost can be selected as providing the partition of the parent node bounding volume to produce the child node BVs for implementation with the BVH structure.

The aforementioned features of varying the position of a particular split plane (e.g., the second candidate split plane 603) described in FIGS. 5A-C can also be incorporated into the multiple bin partition technique used in FIGS. 6A and 6B.

FIG. 6C illustrates the implementation of a modified second candidate split plane 603' in accordance with the invention. In this embodiment, the candidate split plane 603' is positioned slightly right of its first position 603, such that object 320 does not straddle the split plane 603' but lies within the left (first) child node BV created thereby. Sub-BVs 604' and 608' are modified due to the change in the split plane position, and counters 663 and 665 are changed as well. Opposing side counter totals (3-v-5) and aggregate BVs appear to be more in balance than the previous splits at 601, 603 and 605. The aggregate BV and counter totals for Bins 1 and 4 do not change, as these bins have not been impacted by the change in the position of the second candidate split plane for 603 to 603'. The bin volume of contracting Bin 3 may not be re-computed in order to provide a worst case split cost and to avoid additional computation. In such an instance, the aggregate BV for the right (second) child BV need not be recomputed.

FIG. 6D illustrates the implementation of a modified second candidate split plane 603" in accordance with the invention. In this embodiment, the candidate split plane 603" is positioned slightly left of its first position 603, such that object 320 does not straddle the split plane 603" but lies within the right (second) child node BV created thereby. Sub-BVs 604" and 608" are modified due to the change in the split plane position, and counters 663 and 665 are changed as well. Opposing side counter totals (1-v-7) and aggregate BVs appear to be more unbalanced compared to the previous splits at 601, 603 and 605. The aggregate BV and counter totals for Bins 1 and 4 do not change, as these bins have not been impacted by the change in the position of the second candidate split plane for 603 to 603". The bin volume of contracting Bin 2 may not be re-computed in order to provide a worst case split cost and to avoid additional computation. In such an instance, the aggregate BV for the left (first) child BV need not be recomputed.

Figure 7:
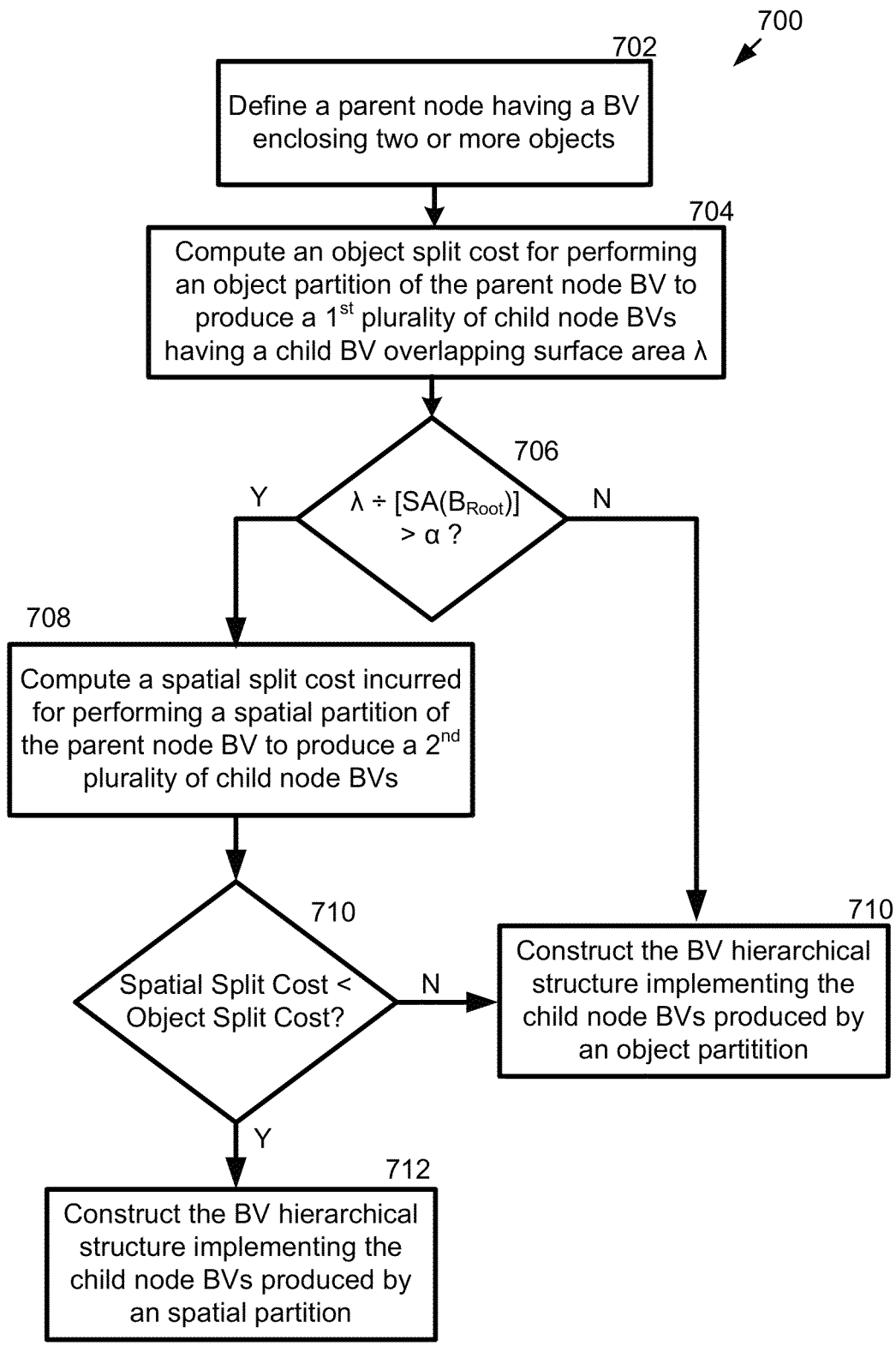
FIG. 7 illustrates a second exemplary method for constructing a bounding volume hierarchical structure in accordance with the present invention.

FIG. 7 illustrates a second exemplary method for constructing a bounding volume hierarchical structure in accordance with the present invention. In this embodiment, the computation of one or more spatial split costs is made conditional upon the relationship between the surface area of the root node BV and the surface area overlap of child node BVs produced by an objection partition of the parent node BV.

At 702, a parent node is defined for the bounding volume hierarchical structure, the parent node including a parent node bounding volume enclosing a plurality of objects. At 704, a first cost is computed for performing an object partition of the parent node bounding volume, the object partitioning forming a first plurality of child node bounding volumes, the plurality of child node bounding volumes having an overlapping surface area. In a particular embodiment, the first cost, referred to as an object partition cost, represents the lowest cost for object partitioning of the parent node, i.e., the partition provides the best object partitioning of the parent node.

At 706, a determination is made as to whether the surface area overlap is greater than the root node surface area by a predefined factor:

$$\frac{\lambda}{SA(B_{Root})} > \alpha$$

where:

$\lambda$ is the surface area of the overlapping region of the object-partitioned child node BVs;

$SA(B_{Root})$ is the surface area of the root node BV; and $\alpha$ is a weight factor In a specific embodiment, the weight factor $\alpha$ ranges from 0 to 1, and more particularly from $1e^{-2}$ to $1e^{-8}$, and even more particularly from $1e^{-3}$ to $2e^{-7}$.

The condition at 706 provides a threshold check to determine if computing spatial partitioning costs is expected to be fruitful. If the condition at 706 is not met, spatial partitioning is not attempted and the parent node BV is object partitioned (operation 710). In this manner, reference duplication and the amount of compute resources needed to carryout those operations can be saved.

If the condition at 706 is true, the process proceeds to 708, where a second cost is computed for performing a spatial partitioning of the parent node bounding volume to produce a second plurality of child node bounding volumes. In a particular embodiment, the second cost, referred to as a spatial partition cost, represents the lowest cost for object partitioning of the parent node, i.e., the partition provides the best object partitioning of the parent node. Operation 708 may be computed using any of the operations described in FIGS. 1, 4A, and 5A.

At 710, a determination is made as to whether the spatial partition cost is less than the object partition cost. If the determination at 710 is true, then the BVH structure is constructed using the child node BVs produce from a spatial partition of the parent node bounding volume at 712, such a BVH structure illustrated in FIG. 1. If the computed spatial partition cost is not less than the object partition cost, then the BVH structure is constructed using child node BVs produced from the object partitioning of the parent node BV.

Figure 8:
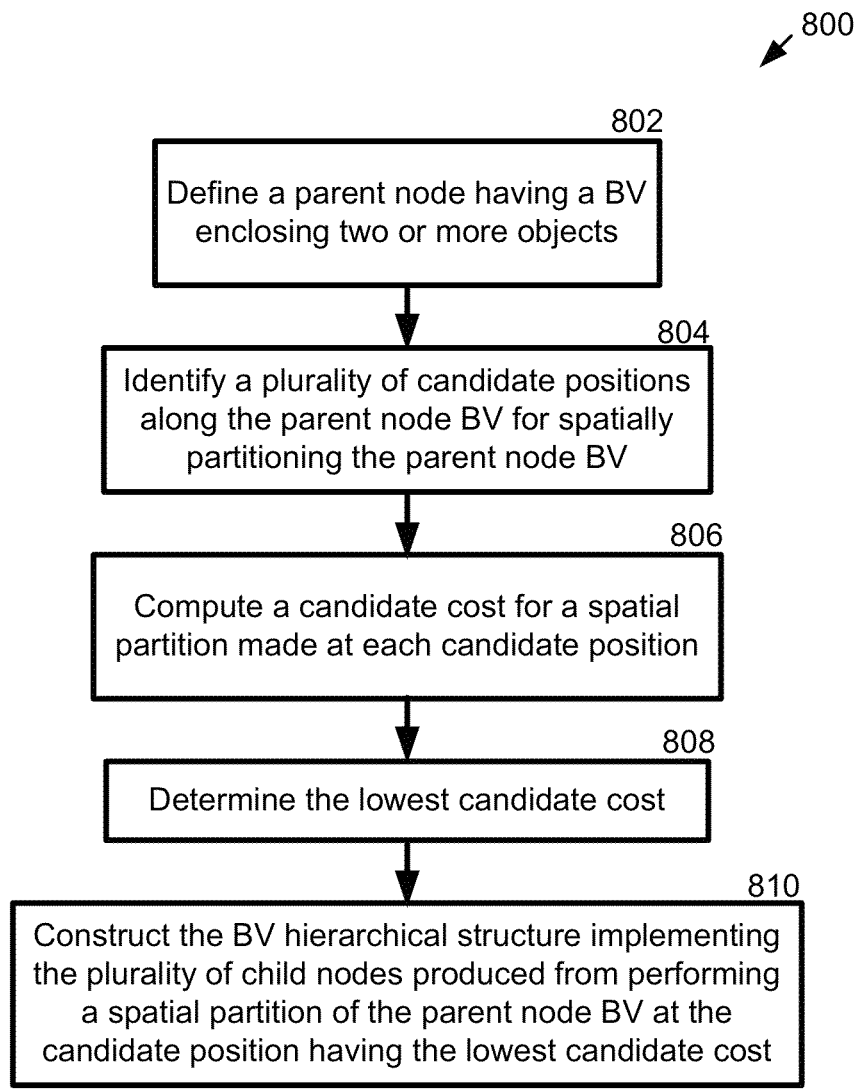
FIG. 8 illustrates a third exemplary method for constructing a bounding volume hierarchical structure in accordance with the present invention.

FIG. 8 illustrates a third exemplary method for constructing a bounding volume hierarchical structure in accordance with the present invention. In this embodiment, a plurality of different candidate split planes are identified for a parent node of a BVH structure, and the candidate split plane providing the lost split cost is chosen as the split plane for partitioning the parent node bounding volume to produce the child node BVs employed within the BVH structure.

At 802, a parent node for the bounding volume hierarchical structure is defined, the parent node including a parent node bounding volume enclosing a plurality of objects. At 804, a plurality of candidate split planes intersecting the parent node bounding volume are identified. At 806, a plurality of candidate costs are computed, each candidate cost incurred for performing a spatial partition of the parent node bounding volume along a respective one of the identified candidate split planes to produce a respective plurality of child node bounding volumes. At 808, the lowest of the plurality of candidate costs and the candidate split plane associated therewith is determined. At 810, the bounding volume hierarchical structure is constructed implementing the plurality of child node bounding volumes which are produced from the spatial partition along the candidate split plane associated with the lowest candidate cost, such a BVH structure illustrated in FIG. 1. In an exemplary embodiment, operations 804, 806, 808, and 810 are carried out using respective operations 202, 502, 504, 506, and 208 shown in FIGS. 2 and 5.

The present invention may be implemented as a processor which is configured to perform the operations as described herein to construct a bounding volume hierarchical structure. The processor may be a scalar processor operable to perform operations upon one data element, or a vector/array processor (e.g., a SIMD architecture) operable to perform operations of multiple data elements simultaneously. The processor may be implemented in various forms, for example, a central processing unit (CPU) intended to operate centrally within a computer or other programmable system. In another embodiment, the processor is implemented as a graphics processing unit (GPU) which may be adapted for visual computing applications, or alternatively, as a general purpose GPU (GPGPU) implemented to carry out many functions normally performed by a CPU. In another embodiment, the processor may be implemented as a microprocessor embedded within a larger/more complex device or system, the microprocessor omitting memory or other peripheral components provided by the larger device/system. A non-exhaustive list of the aforementioned systems which may incorporate the processor of the present invention includes computers, workstations, cellular telephones, game consoles, and motherboards. Exemplary applications for which the bounding volume hierarchical structure is construction include application in ray tracing and collision detection.

Figure 9:
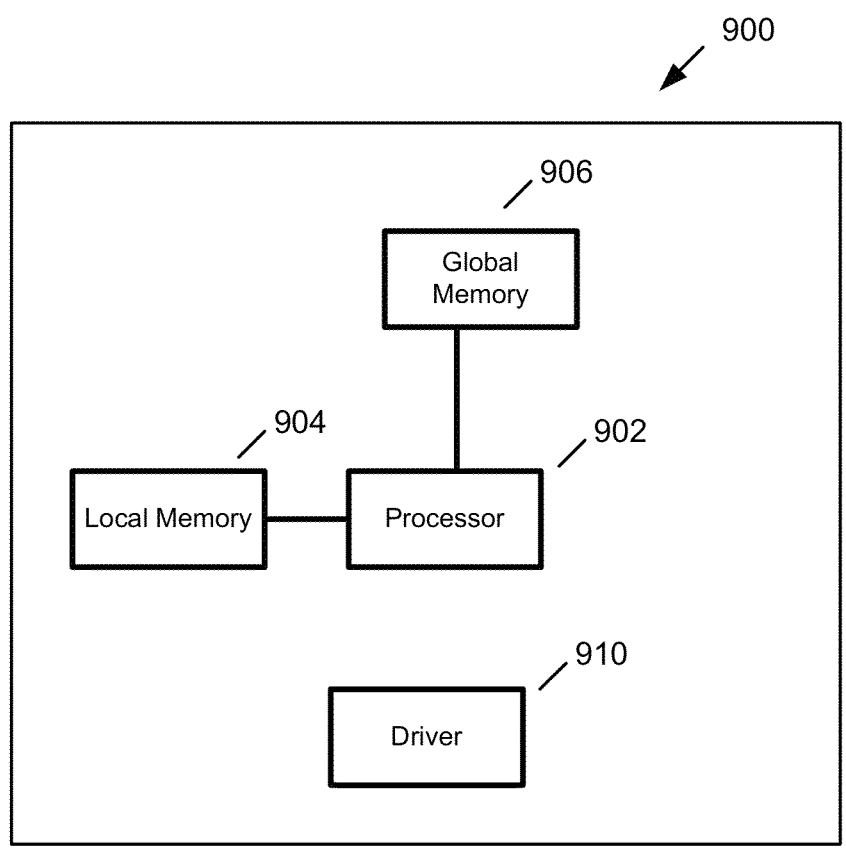
FIG. 9 illustrates a system operable to construct a bounding volume hierarchical structure in accordance with the present invention.

FIG. 9 illustrates an exemplary graphics processing subsystem 900 employing a processor 902 operable to perform the operations illustrated in accordance with the present invention. In one embodiment, processor 902 is a parallel processing architecture, such as a single instruction multiple data (SIMD) architecture of a predefined width or "warp," for example 32, 64, 128, or 256 threads. Further particularly, the processor 902 includes processor circuitry (e.g., the digital and logic circuitry) operable to perform the operations of each of the methods as described herein.

The processor 902 may further include local memory 904 which is physically or logically allocated to the processor. The sub-system 900 may also include a global memory 906 which is accessible to each of the processors. The system 900 may further include one or more drivers 910 for controlling the operation of the sub-system 902 in accordance with the methods described herein. In one embodiment, the sub-system 900 is included within in a graphics card. In another embodiment, the sub-system 900 is included within the motherboard of a computer or workstation or on a game console. In another embodiment, the sub-system is realized in an embedded system, such as in a cellular telephone.

As readily appreciated by those skilled in the art, the described processes and operations may be implemented in hardware, software, firmware or a combination of these implementations as appropriate. In addition, some or all of the described processes and operations may be implemented as computer readable instruction code, which may be resident on a computer readable medium, the instruction code operable to control a computer of other such programmable device to carry out the intended functions. The computer readable medium on which the instruction code resides may take various forms, for example, a removable disk, volatile or non-volatile memory, etc.

The terms "a" or "an" are used to refer to one, or more than one feature described thereby. Furthermore, the term "coupled" or "connected" refers to features which are in communication with each other (electrically, mechanically, thermally, optically, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for constructing a bounding volume hierarchical structure, comprising;
    defining, utilizing at least one processor, a parent node for a bounding volume hierarchical structure, the parent node including a parent node bounding volume enclosing a plurality of objects;
    computing, utilizing the at least one processor, a first cost for performing an object partition of the parent node bounding volume to produce a first plurality of child node bounding volumes;
    computing, utilizing the at least one processor, a second cost for performing a spatial partitioning of the parent node bounding volume to produce a second plurality of child node bounding volumes; and
    constructing, utilizing the at least one processor, the bounding volume hierarchical structure implementing the second plurality of child node bounding volumes produced from the spatial partitioning of the parent node bounding volume if the second cost is lower than the first cost;
    wherein computing the second cost for performing the spatial partitioning of the parent node bounding volume comprises:
        identifying a plurality of candidate split planes intersecting the parent node bounding volume for spatially partitioning the parent node bounding volume,
        computing a plurality of candidate costs, each candidate cost corresponding to a cost for performing a spatial partition of the parent node bounding volume along a respective one of the plurality of candidate split planes, and
        determining the lowest of the plurality of candidate costs as the second cost, wherein the lowest candidate cost has one of the plurality of candidate split planes associated therewith;
    wherein constructing the bounding volume hierarchical structure comprises constructing the bounding volume hierarchical structure implementing a plurality of child node bounding volumes which are produced from the spatial partition along the candidate split plane associated with the lowest candidate cost;
    wherein identifying the plurality of candidate planes includes:
        identifying a first candidate split plane along which the parent node bounding volume is partitioned into first and second child node bounding volumes, wherein when the parent node bounding volume is spatially partitioned along the first candidate split plane a particular object traverses the first candidate split plane into each of the first and second child node bounding volumes, and
        identifying a second candidate split plane along which the parent node bounding volume is partitioned into third and fourth child node bounding volumes, wherein when the parent node bounding volume is spatially partitioned along the second candidate split plane the particular object is completely included in the third child node bounding volume and does not extend into the fourth child node bounding volume;
    wherein computing the plurality of candidate costs comprises computing first and second candidate costs for performing a spatial partitioning of the parent node bounding volume along each of the first and second candidate split planes, respectively; and
    wherein determining the lowest of the plurality of candidate costs as the second cost comprises determining the lowest of the first and second candidate costs.

2. The method of claim 1, further comprising constructing the bounding volume hierarchical structure implementing the first plurality of child nodes produced from the object partitioning of the parent node if the first cost is lower or equal than the second cost.

3. The method of claim 1, wherein each of the first and second costs are computed according to a surface area heuristic cost function.

4. The method of claim 1,
    wherein identifying a plurality of candidate split planes further includes identifying a third candidate split plane along which the parent node bounding volume is partitioned into fifth and sixth child node bounding volumes, wherein when the parent node bounding volume is spatially partitioned along the third candidate split plane the particular object is completely included in the sixth child node bounding volume and does extend into the fifth child node bounding volume;
    wherein computing a plurality of candidate costs further comprises computing a third candidate costs for performing a spatial partitioning of the parent node bounding volume along the third candidate split plane; and
    wherein determining the lowest of the plurality of candidate costs as the second cost comprises determining the lowest of the first, second and third candidate costs.

5. The method of claim 1,
    wherein a bin is formed on each opposing side of each of the plurality of candidate split planes;
    wherein each of the plurality of objects includes an objects ad an object ending; and wherein computing each of the plurality of candidate costs for spatially partitioning the parent node bounding volume at the corresponding candidate split plane comprises:
- determining an aggregate bounding volume for each opposing side of the corresponding candidate split plane,
- determining an aggregate count of object starts and object endings for each opposing side of the corresponding candidate split plane, and
- computing the candidate cost for performing the spatial partition of the parent node bounding volume along the corresponding candidate split plane based upon the aggregate bounding volumes and the aggregate count of object starts and object endings on each opposing side of the corresponding candidate split plane.

6. The method of claim 1, further comprising constructing the bounding volume hierarchical structure implementing a plurality of grandchild nodes, comprising:
for a particular child node that includes a child node bounding volume enclosing a plurality of objects:
- computing a third cost for performing an object partitioning of the particular child node bounding volume to construct a first plurality of grandchild node bounding volumes;
- computing a fourth cost for performing a spatial partitioning of the particular child node bounding volume to construct a second plurality of grandchild node bounding volumes; and
- constructing the bounding volume hierarchical structure implementing the second plurality of grandchild node bounding volumes produced from spatially partitioning the particular child node bounding volume if the fourth cost is lower than the third cost.

7. The method of claim 6, further comprising constructing the bounding volume hierarchical structure to implement the first plurality of grandchild node bounding volumes produced from object partitioning the particular child node bounding volume if the third cost is lower than the fourth cost.

8. A method for constructing a bounding volume hierarchical structure having a root node of surface area $SA(B_{root})$, the method comprising:
- defining, utilizing at least one processor, a parent node for the bounding volume hierarchical structure, the parent node including a parent node bounding volume enclosing a plurality of objects;
- computing, utilizing the at least one processor, a first cost for performing an object partition of the parent node bounding volume, the object partitioning forming a first plurality of child node bounding volumes, the plurality of child node bounding volumes having an overlapping region with surface area $\lambda$; and
- if the surface area overlap $\lambda$ is greater than the root node surface area $SA(B_{root})$ by a predefined factor:
  - computing, utilizing the at least one processor, a second cost for performing a spatial partitioning of the parent node bounding volume to produce a second plurality of child node bounding volumes; and
  - constructing, utilizing the at least one processor, the bounding volume hierarchical structure implementing the second plurality of child node bounding volumes produced from the spatial partitioning of the parent node bounding volume if the second cost is lower than the first cost.

9. The method of claim 8, further comprising constructing the bounding volume hierarchical structure implementing the first plurality of child nodes produced from the object partitioning of the parent node if the first cost is lower or equal than the second cost.

10. The method of claim 8, wherein each of the first and second costs are computed according to a surface area heuristic cost function.

11. The method of claim 8, further comprising:
- identifying a split plane intersecting the parent node bounding volume for spatial partitioning, whereby first and second child node bounding volumes are formed thereby;
- assigning each object within the parent node bounding volume to at least one of the first and second child node bounding volumes;
- wherein computing the second cost comprises computing the cost of spatially partitioning the parent node bounding volume at the identified split plane based upon the first and second child node bounding volumes and the one or more parent node objects assigned thereto.

12. The method of claim 8, wherein computing the second cost for performing a spatial partitioning of the parent node bounding volume comprises:
- identifying a plurality of candidate split planes intersecting the parent node bounding volume for spatially partitioning the parent node bounding volume;
- computing a plurality of candidate costs, each candidate cost corresponding to a cost for performing a spatial partition of the parent node bounding volume at a respective one of the plurality of candidate split planes; and
- determining the lowest of the plurality of candidate costs as the second cost, wherein the lowest candidate cost has one of the plurality of candidate split planes associated therewith; and
- wherein constructing the bounding volume hierarchical structure comprises constructing the bounding volume hierarchical structure implementing a plurality of child node bounding volumes which are produced from the spatial partition along the candidate split plane associated with the lowest candidate cost.

13. The method of claim 12,
wherein identifying a plurality of candidate split planes includes:
- identifying a first candidate split plane along which the parent node bounding volume is partitioned into first and second child node bounding volumes, wherein when the parent node bounding volume is spatially partitioned along the first candidate split plane a particular object traverses the first candidate split plane into each of the first and second child node bounding volumes; and
- identifying a second candidate split plane along which the parent node bounding volume is partitioned into third and fourth child node bounding volumes, wherein when the parent node bounding volume is spatially partitioned along the second candidate split plane the particular object is completely included in the third child node bounding volume and does not extend into the fourth child node bounding volume;
wherein computing the plurality of candidate costs comprises computing first and second candidate costs for performing a spatial partitioning of the parent node bounding volume along each of the first and second candidate split planes, respectively; and
wherein determining the lowest of the plurality of candidate costs as the second cost comprises determining the lowest of the first and second candidate costs.

14. A method for constructing abounding volume hierarchical structure, comprising:
- defining, utilizing at least one processor, a parent node for a bounding volume hierarchical structure, the parent node including a parent node bounding volume enclosing a plurality of objects;
- identifying, utilizing the at least one processor, a plurality of candidate split planes intersecting the parent node bounding volume;
- computing, utilizing the at least one processor, a plurality of candidate costs, each candidate cost incurred for performing a spatial partition of the parent node bounding volume along a respective one of the identified candidate split planes to produce a respective plurality of child node bounding volumes; and
- determining, utilizing the at least one processor, the lowest of the plurality of candidate costs and the candidate split plane associated therewith; and
- constructing, utilizing the at least one processor, the bounding volume hierarchical structure implementing the plurality of child node bounding volumes which are produced from the spatial partition along the candidate split plane associated with the lowest candidate cost
- wherein identifying the plurality of candidate split planes includes:
  - identifying a first candidate split plane along which the parent node bounding volume is partitioned into first and second child node bounding volumes, wherein when the parent node bounding volume is spatially partitioned along the first candidate split plane a particular object traverses the first candidate split plane into each of the first and second child node bounding volumes, and
  - identifying a second candidate split plane along which the parent node bounding volume is partitioned into third and fourth child node bounding volumes, wherein when the parent node bounding volume is spatially partitioned along the second candidate split plane the particular object is completely included in the third child node bounding volume and does not extend into the fourth child node bounding volume;
- wherein computing the plurality of candidate costs comprises computing first and second candidate costs for performing a spatial partitioning of the parent node bounding volume along each of the first and second candidate split planes, respectively; and
- wherein determining the lowest of the plurality of candidate costs as the second cost comprises determining the lowest of the first and second candidate costs.

15. The method of claim 14,
- wherein a bin is formed on each opposing side of each of the plurality of candidate split plane;
- wherein each of the plurality of objects includes an object start and an object ending; and
- wherein computing each of the plurality of candidate costs for spatially partitioning the parent node bounding volume at the corresponding candidate split plane comprises:
  - determining an aggregate bounding volume for each opposing side of the corresponding candidate split plane;
  - determining an aggregate count of object starts and object endings for each opposing side of the corresponding candidate split plane; and
  - computing the candidate cost for performing the spatial partition of the parent node bounding volume along the corresponding candidate split plane based upon the aggregate bounding volumes and the aggregate count of object starts and object endings on each opposing side of the corresponding candidate split plane.

16. A processor operable to construct a bounding volume hierarchical structure, comprising:
- processor circuitry operable to define a parent node for a bounding volume hierarchical structure, the parent node including a parent node bounding volume enclosing a plurality of objects;
- processor circuitry operable to compute a first cost for performing an object partition of the parent node bounding volume to produce a first plurality of child node bounding volumes;
- processor circuitry operable to compute a second cost for performing a spatial partitioning of the parent node bounding volume to produce a second plurality of child node bounding volumes; and
- processor circuitry operable to construct the bounding volume hierarchical structure implementing the second plurality of child node bounding volumes produced from the spatial partitioning of the parent node bounding volume if the second cost is lower than the first cost;
- wherein the processor is operable such that computing the second cost for performing the spatial partitioning of the parent node bounding volume comprises:
  - identifying a plurality of candidate split planes intersecting the parent node bounding volume for spatially partitioning the parent node bounding volume,
  - computing a plurality of candidate costs, each candidate cost bounding volume along a respective one of the plurality of candidate split planes, and
  - determining the lowest of the plurality of candidate costs as the second cost, wherein the lowest candidate cost has one of the plurality of candidate split lanes associated therewith;
- wherein the processor is operable such that constructing the bounding volume hierarchical structure comprises constructing the bounding volume hierarchical structure implementing a plurality of child node bounding volumes which are produced from the spatial partition along the candidate split plane associated with the lowest candidate cost;
- wherein the processor is operable such that identifying the plurality of candidate planes includes:
  - identifying a first candidate split plane along which the parent node bounding volume is partitioned into first and second child node bounding volumes, wherein when the parent node bounding volume is spatially partitioned along the first candidate split plane a particular object traverses the first candidate split plane into each of the first and second child node bounding volumes, and
  - identifying a second candidate split plane along which the parent node bounding volume is partitioned into third and fourth child node bounding volumes, wherein when the parent node bounding volume is spatially partitioned along the second candidate split plane the particular object is completely included in the third child node bounding volume and does not extend into the fourth child node bounding volume;
- wherein the processor is operable such that computing the plurality of candidate costs comprises computing first and second candidate costs for performing a spatial partitioning of the parent node bounding volume along each of the first and second candidate split planes, respectively; and wherein the processor is operable such that determining the lowest of the plurality of candidate costs as the second cost comprises determining the lowest of the first and second candidate costs.

17. A processor operable to construct a bounding volume hierarchical structure having a root node of surface area $SA(B_{root})$, the method comprising:

processor circuitry operable to define a parent node for the bounding volume hierarchical structure, the parent node including a parent node bounding volume enclosing a plurality of objects;

processor circuitry operable to compute a first cost for performing an object partition of the parent node bounding volume, the object partitioning forming a first plurality of child node bounding volumes, the plurality of child node bounding volumes having an overlapping region with surface area $\lambda$; and processor circuitry operable to compute a second cost for performing a spatial partitioning of the parent node bounding volume to produce a second plurality of child node bounding volumes if the surface area overlap $\lambda$ is greater than the root node surface area $SA(B_{root})$ by a predefined factor; and processor circuitry operable to construct the bounding volume hierarchical structure implementing the second plurality of child node bounding volumes produced from the spatial partitioning of the parent node bounding volume if the surface area overlap $\lambda$ is greater than the root node surface area $SA(B_{root})$ by the predefined factor, and if the second cost is lower than the first cost.

18. The processor of claim 17, wherein the processor comprises a graphics processor implemented within a graphics processing sub-system.

19. A processor operable to construct a bounding volume hierarchical structure, the processor comprising:

processor circuitry operable to define a parent node for a bounding volume hierarchical structure, the parent node including a parent node bounding volume enclosing a plurality of objects;

processor circuitry operable to identify a plurality of candidate split planes intersecting the parent node bounding volume;

processor circuitry operable to compute a plurality of candidate costs, each candidate cost incurred for performing a spatial partition of the parent node bounding volume along a respective one of the identified candidate split planes to produce a respective plurality of child node bounding volumes; and processor circuitry operable to determine the lowest of the plurality of candidate costs and the candidate split plane associated therewith; and processor circuitry operable to construct the bounding volume hierarchical structure implementing the plurality of child node bounding volumes which are produced from the spatial partition along the candidate split plane associated with the lowest candidate cost wherein the processor is operable such that identifying the plurality of candidate split planes includes:

identifying a first candidate split plane along which the parent node bounding volume is partitioned into first and second child node bounding volumes, wherein when the parent node bounding volume is spatially partitioned along the first candidate split plane a particular object traverses the first candidate split plane into each of the first and second child node bounding volumes, and identifying a second candidate split plane along which the parent node bounding volume is partitioned into third and fourth child node bounding volumes, wherein when the parent node bounding volume is spatially partitioned along the second candidate split plane the particular object is completely included in the third child node bounding volume and does not extend into the fourth child node bounding volume;

wherein the processor is operable such that computing the plurality of candidate costs comprises computing first and second candidate costs for performing a spatial partitioning of the parent node bounding volume along each of the first and second candidate split planes, respectively; and wherein the processor is operable such that determining the lowest of the plurality of candidate costs as the second cost comprises determining the lowest of the first and second candidate costs.

20. The processor of claim 19, wherein the processor comprises a graphics processor implemented within a graphics processing sub-system.

21. A computer program product, resident on a non-transitory computer readable medium, for providing instructions to construct a bounding volume hierarchical structure, the computer program product comprising:

instruction code for defining a parent node for a bounding volume hierarchical structure, the parent node including a parent node bounding volume enclosing a plurality of objects;

instruction code for computing a first cost for performing an object partition of the parent node bounding volume to produce a first plurality of child node bounding volumes;

instruction code for computing a second cost for performing a spatial partitioning of the parent node bounding volume to produce a second plurality of child node bounding volumes; and instruction code for constructing the bounding volume hierarchical structure implementing the second plurality of child node bounding volumes produced from the spatial partitioning of the parent node bounding volume if the second cost is lower than the first cost;

wherein the computer program product is operable such that computing the second cost for performing the spatial partitioning of the parent node bounding volume comprises:

identifying a plurality of candidate split planes intersecting the parent node bounding volume for spatially partitioning the parent node bounding volume, computing a plurality of candidate costs, each candidate cost corresponding to a cost for performing a spatial partition of the parent node bounding volume along a respective one of the plurality of candidate split planes, and determining the lowest of the plurality of candidate costs as the second cost, wherein the lowest candidate cost has one of the plurality of candidate split planes associated therewith;

wherein the computer program product is operable such that constructing the bounding volume hierarchical structure comprises constructing the bounding volume hierarchical structure implementing a plurality of child node bounding volumes which are produced from the spatial partition along the candidate split plane associated with the lowest candidate cost;

wherein the computer program is operable such that identifying the plurality of candidate planes includes:

identifying a first candidate split plane along which the parent node bounding volume is partitioned into first and second child node bounding volumes, wherein when the parent node bounding volume is spatially partitioned along the first candidate split plane a particular object traverses the first candidate split plane into each of the first and second child node bounding volumes, and identifying a second candidate split plane along which the parent node bounding volume is partitioned into third and fourth child node bounding volumes, wherein when the parent node bounding volume is spatially partitioned along the second candidate split plane the particular object is completely included in the third child node bounding volume and does not extend into the fourth child node bounding volume;

wherein the computer program product is operable such that computing the plurality of candidate costs comprises computing first and second candidate costs for performing a spatial partitioning of the parent node bounding volume along each of the first and second candidate split planes, respectively; and wherein the computer program product is operable such that determining the lowest of the plurality of candidate costs as the second cost comprises determining the lowest of the first and second candidate costs.

22. A computer program product, resident on a non-transitory computer readable medium, for providing instructions to construct a bounding volume hierarchical structure having a root node of surface area $SA(B_{root})$, the computer program product comprising:

instruction code for defining a parent node for the bounding volume hierarchical structure, the parent node including a parent node bounding volume enclosing a plurality of objects;

instruction code for computing a first cost for performing an object partition of the parent node bounding volume, the object partitioning forming a first plurality of child node bounding volumes, the plurality of child node bounding volumes having an overlapping region with surface area $\lambda$;

instruction code for computing a second cost for performing a spatial partitioning of the parent node bounding volume to produce a second plurality of child node bounding volumes if the surface area overlap $\lambda$ is greater than the root node surface area $SA(B_{root})$ by a predefined factor; and instruction code for constructing the bounding volume hierarchical structure implementing the second plurality of child node bounding volumes produced from the spatial partitioning of the parent node bounding volume if the surface area overlap $\lambda$ is greater than the root node surface area $SA(B_{root})$ by a predefined factor, and if the second cost is lower than the first cost.

23. A computer program product, resident on a non-transitory computer readable medium, for providing instructions to construct a bounding volume hierarchical structure, the computer program product comprising:

instruction code for defining a parent node for a bounding volume hierarchical structure, the parent node including a parent node bounding volume enclosing a plurality of objects;

instruction code for identifying a plurality of candidate split planes intersecting the parent node bounding volume;

instruction code for computing a plurality of candidate costs, each candidate cost incurred for performing a spatial partition of the parent node bounding volume along a respective one of the identified candidate split planes to produce a respective plurality of child node bounding volumes; and instruction code for determining the lowest of the plurality of candidate costs and the candidate split plane associated therewith; and instruction code for constructing the bounding volume hierarchical structure implementing the plurality of child node bounding volumes which are produced from the spatial partition along the candidate split plane associated with the lowest candidate cost;

wherein the computer program product is operable such that identifying the plurality of candidate split planes includes:

identifying a first candidate split plane along which the parent node bounding volume is partitioned into first and second child node bounding volumes, wherein when the parent node bounding volume is spatially partitioned along the first candidate split plane a particular object traverses the first candidate split plane into each of the first and second child node bounding volumes, and identifying a second candidate split plane along which the parent node bounding volume is partitioned into third and fourth child node bounding volumes, wherein when the parent node bounding volume is spatially partitioned along the second candidate split plane the particular object is completely included in the third child node bounding volume and does not extend into the fourth child node bounding volume;

wherein the computer program product is operable such that computing the plurality of candidate costs comprises computing first and second candidate costs for performing a spatial partitioning of the parent node bounding volume along each of the first and second candidate split planes, respectively; and wherein the computer program product is operable such that determining the lowest of the plurality of candidate costs as the second cost comprises determining the lowest of the first and second candidate costs.

* * * * *